United States Patent
Margolis

(10) Patent No.: US 8,024,618 B1
(45) Date of Patent: Sep. 20, 2011

(54) MULTI-CLIENT AND FABRIC DIAGNOSTICS AND REPAIR

(75) Inventor: Michael Ryan Margolis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 11/694,790

(22) Filed: Mar. 30, 2007

(51) Int. Cl.
*G06F 11/00* (2006.01)

(52) U.S. Cl. .......................................................... 714/43

(58) Field of Classification Search ................ 714/4, 25, 714/37–39, 43–45, 47, 56
See application file for complete search history.

(56) References Cited

U.S. PATENT DOCUMENTS

| | | | |
|---|---|---|---|
| 6,237,032 B1 * | 5/2001 | Scoville et al. ................ | 709/221 |
| 6,654,914 B1 * | 11/2003 | Kaffine et al. .................. | 714/43 |
| 6,880,100 B2 * | 4/2005 | Mora et al. ........................ | 714/4 |
| 7,184,942 B2 * | 2/2007 | Graves et al. .................... | 703/13 |
| 7,237,138 B2 * | 6/2007 | Greenwald et al. ............... | 714/4 |
| 7,281,040 B1 * | 10/2007 | Ly ................................. | 709/224 |
| 7,302,608 B1 * | 11/2007 | Acharya et al. .................. | 714/13 |
| 7,606,889 B1 * | 10/2009 | Kundala et al. .................. | 709/223 |
| 2001/0029529 A1 * | 10/2001 | Tachibana et al. ............ | 709/220 |
| 2002/0010803 A1 * | 1/2002 | Oberstein et al. ............. | 709/318 |
| 2002/0138443 A1 * | 9/2002 | Schran et al. ................... | 705/64 |
| 2002/0178217 A1 * | 11/2002 | Nguyen et al. ................ | 709/203 |
| 2004/0006612 A1 * | 1/2004 | Jibbe et al. ..................... | 709/223 |
| 2004/0083389 A1 * | 4/2004 | Yoshida .......................... | 713/201 |
| 2004/0088437 A1 * | 5/2004 | Stimac .......................... | 709/249 |
| 2004/0199618 A1 * | 10/2004 | Knight et al. .................. | 709/223 |
| 2004/0249916 A1 * | 12/2004 | Graves et al. .................. | 709/223 |
| 2006/0233311 A1 * | 10/2006 | Adams et al. .................... | 379/21 |
| 2008/0181102 A1 * | 7/2008 | Del Regno ....................... | 370/223 |
| 2008/0239944 A1 * | 10/2008 | Golla et al. .................... | 370/216 |

\* cited by examiner

*Primary Examiner* — Nadeem Iqbal

(74) *Attorney, Agent, or Firm* — Fish & Richardson P.C.

(57) ABSTRACT

Systems, methods, and computer program products for network diagnostics and repair are provided. In some implementations, a method is provided. The method includes scanning a network for one or more network problems, identifying one or more problem, the identifying including comparing configuration data of a plurality of electronic devices for inconsistencies, and correcting the one or more identified problems.

25 Claims, 4 Drawing Sheets

MULTI-CLIENT AND FABRIC DIAGNOSTICS AND REPAIR

BACKGROUND

The present disclosure relates to computer networks.

A conventional network such as a local area network ("LAN") or wide area network ("WAN") can include a number of different components. The components include, for example, client devices and different types of servers (e.g., domain name systems ("DNS") servers, file servers). Typically, the components are interconnected using different transmission mediums such as fiber optic cables, Ethernet cables, wired or wireless technologies. The network communications can be provided by a number of channels and routers forming a network fabric, which provides the physical infrastructure of the network.

One type of network is a storage area network ("SAN"). A conventional SAN provides data transfer between computer systems and storage devices. A SAN typically uses fiber channel switches to form a network fabric connecting storage devices to different computer systems (e.g., client devices). The SAN can route requested data to client devices or servers by routing particular data blocks or files from the appropriate storage devices to the requesting device.

Because of the numerous connections for each network, correct setup and maintenance of network connectivity can be difficult. For example, client devices can lose connectivity to servers on a network or lose connectivity to storage devices (e.g., fiber or iSCSI connectivity). Additionally, client devices can accidentally break connections, for example, by initializing a firewall that blocks particular ports, stopping use of a network time server, or changing other network configurations.

Conventionally, when trying to correct a network problem, a user typically moves through a series of troubleshooting questions in an attempt to pinpoint the problem. Once identified, the user typically performs the corrections manually.

SUMMARY

Systems, methods, and computer program products for network diagnostics and repair are provided. In general, in one aspect, a method is provided. The method includes scanning a network for one or more network problems, identifying one or more problem, the identifying including comparing configuration data of a plurality of electronic devices for inconsistencies, and correcting the one or more identified problems. Other embodiments of this aspect include corresponding systems, apparatus, computer program products, and computer readable media.

Implementations of the method can include one or more of the following features. The method can further include generating a report of the one or more identified problems and recommending corrective action for each of the one or more identified problems. The method can further include receiving user input selecting one or more problems to correct and correcting the selected problems. The method can further include receiving an input to scan the network for problems. The correcting the one or more identified problems can include automatically correcting the identified problems. The scanning the network can include performing the scanning according to a schedule. The identifying a problem can include performing one or more diagnostic tests, comparing configuration settings for more than one device associated with the network, identifying a problem with one or more configuration files, and identifying a network latency problem.

In general, in another aspect, a method is provided. The method includes monitoring for one or more problems associated with a network, identifying a problem, and correcting the identified problem. Other embodiments of this aspect include corresponding systems, apparatus, computer program products, and computer readable media.

Implementations of the method can include one or more of the following features. The monitoring can include monitoring the network using a plurality of electronic devices distributed throughout the network. The method can further include determining whether to report the identified problem or to automatically correct the identified problem according to one or more correcting rules. The method can further include generating a report of the identified problem and recommending corrective action for the identified problem. The method can further include receiving a user input to correct the identified problem and correcting the identified problem. The method can further include automatically correcting the identified problem. The method can further include generating a report identifying the corrected problem. The monitoring can include monitoring for changes to network configuration settings of one or more devices coupled to the network or monitoring for changes in network performance.

In general, in one aspect, a system is provided. The system includes a monitoring engine for monitoring a network, the monitoring engine including a plurality of components distributed throughout the network and operable to identify one or more types of network problems and a correction engine operable to automatically correct identified network problems. The system can further include a reporting engine operable to present identified problems to a user and to recommend action to correct the identified problems.

Particular embodiments of the invention can be implemented to realize one or more of the following advantages. A network can be actively scanned or passively monitored for problems. Network problems can be automatically detected and corrected without user intervention. Problems which are not apparent when examining a single machine can be detected by examining the network, in whole or in part. For example, a configuration can be valid in the context of a single device but incompatible with one or more other devices on the network. Examination of performance and configuration can be performed to identify hard to detect problems particularly on networks having many client devices.

The details of the various aspects of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
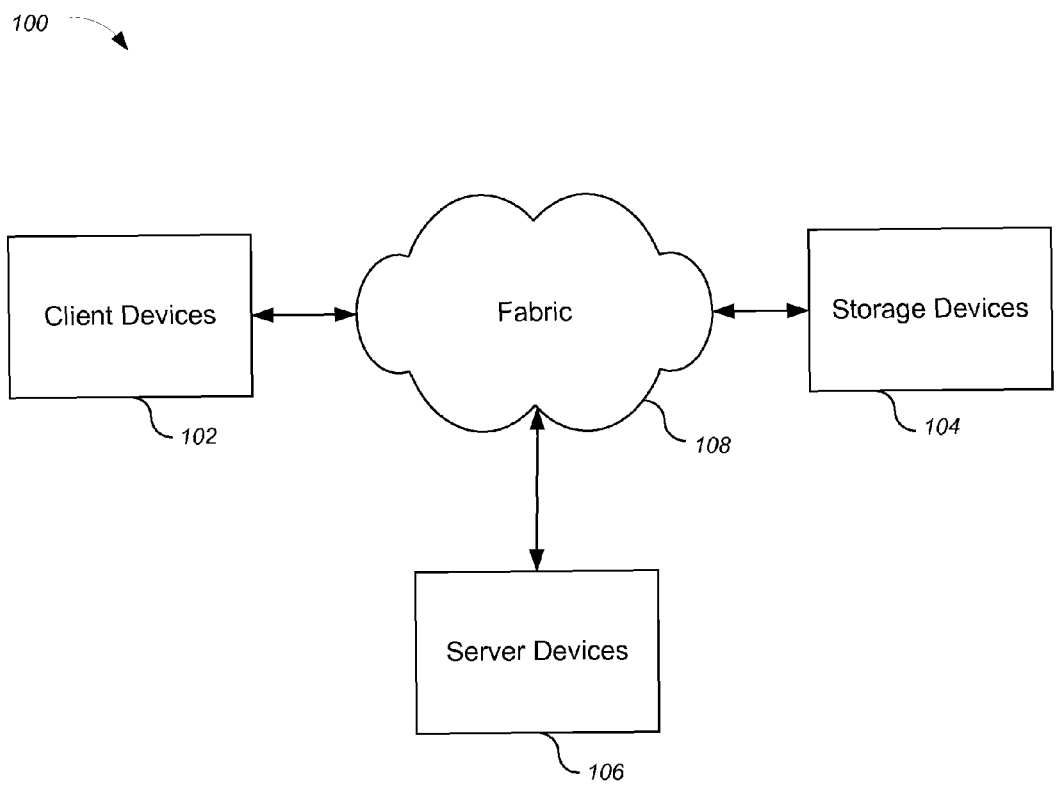
FIG. 1 is a block diagram of an example network.

FIG. 1 is a block diagram of an example network 100. The network 100 includes client devices 102, server devices 104, and storage devices 106 interconnected by a fabric 108. In one implementation, the network 100 is a SAN.

The client devices 102 can include individual user workstations such as desktop computers, notebook computers, and other network devices. Additionally, the client devices 102 can include other types of individual electronic devices such as personal data assistants, mobile phones, and the like. The client devices 102 can request particular data stored in one or more of the storage devices 106. Additionally, the client devices 102 can store data in one or more of the storage devices 106.

The server devices 104 can manage the client devices 102, storage devices 106, as well as the network connections of the fabric 108. The server devices 104 can include, for example, DNS servers, open directory servers, file servers, and SAN metadata controller servers. In one implementation, individual client device 102 requests for data stored in storage devices 106 are executed by one or more server devices 104.

The storage devices 106 can store data, which can be retrieved by one or more of the client devices 102 (directly or through one or more of the server devices 104). The storage devices 106 can include, for example, one or more disks or disk arrays (e.g., hard disk drives, optical disks), tape drives, or other data storage devices. Data storage in the storage devices 106 can be implemented using block storage, file storage techniques or other storage techniques.

The fabric 108 provides the connections between the client devices 102, server devices 104, and storage devices 106 of the network 100. The fabric 108 can include one or more fiber channel networks, one or more Ethernet networks, as well as wireless, cable, or other connections. In one implementation, the fabric 108 includes multiple fiber channel switches. The fiber channel switches can route communications between any of the client devices 102 and any of the storage devices 104 using one or more switched paths.

Figure 2:
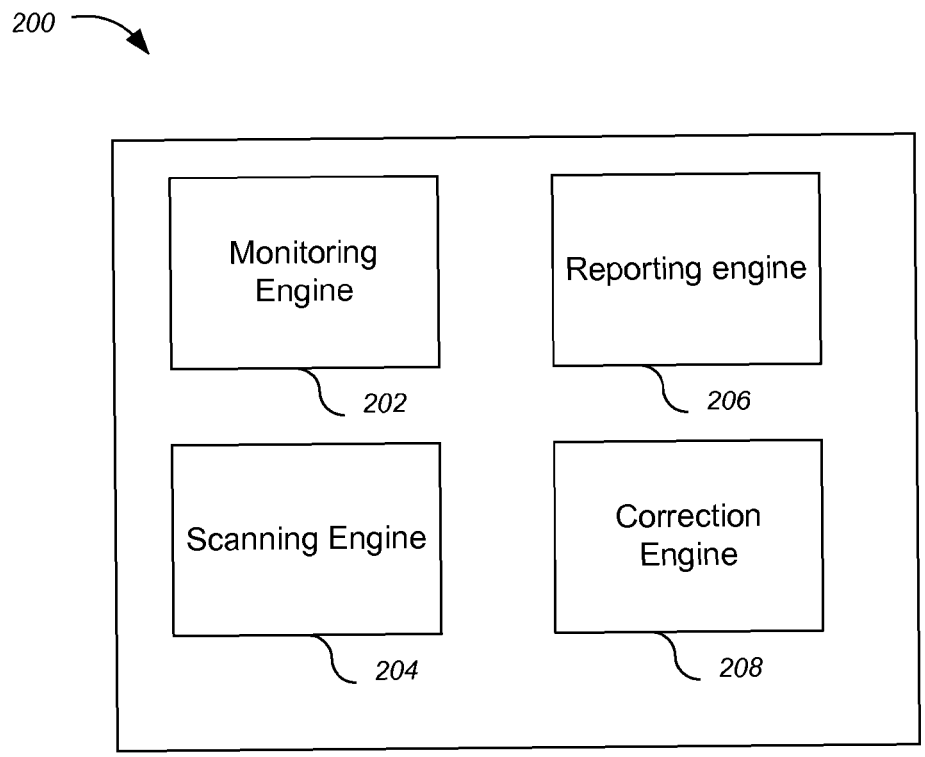
FIG. 2 is a block diagram of an example network manager.

FIG. 2 shows an example block diagram of a network manager 200. The network manager 200 includes a monitoring engine 202, a scanning engine 204, a reporting engine 206, and a correction engine 208.

The monitoring engine 202 can monitor the network for problems. For example, the monitoring engine 202 can passively monitor network performance in the background. The monitoring engine 202 can monitor network parameters such as configuration settings, connections with the different devices connected to the network, as well as traffic flow and routing of data. If a problem is detected, the monitoring engine 202 can provide information about the problem to the reporting engine 206 and/or the correcting engine 208. In one implementation, the monitoring engine 202 can perform one or more diagnostics tests based on monitored events in order to identify problems. In one implementation, the monitoring engine 202 monitors the network for problems according to one or more rules. The rules can identify particular types of problems, signatures, etc. to look for.

In one implementation, the monitoring engine 202 monitors continuously in the background. Thus, the monitoring engine 202 allows for a substantially constant monitoring of the network without direct administrator interaction. In one implementation, the monitoring engine 202 can constantly monitor only a subset of parameters that can be actively scanned by the scanning engine 204.

In another implementation, the functions performed by the monitoring engine 202 can be distributed among a number of different electronic devices (e.g., different client devices or server devices). The individual client devices can report identified problems to the network manager 200.

The scanning engine 204 can actively scan the network for problems. In one implementation, upon a request (e.g., from a user) to the network manager 200, the scanning engine 204 can actively scan the network. In another implementation, the scanning engine 204 can perform network scans according to a schedule. Periodically scheduled scans can be based on predefined or user defined time periods. The scanning engine 204 can examine features of the network similar to those monitored by the monitoring engine 202. For example, the scanning engine 204 can scan configuration settings, connections with the different devices connected to the network, as well as traffic flow and routing. Scanning can include performing one or more diagnostic tests. The scanning can identify problems according to one or more scanning rules. If a problem is detected, the scanning engine 204 can provide information about the problem to the reporting engine 206 and/or the correcting engine 208. In one implementation, the invasive scanning performed by the scanning engine 204 can provide a more detailed scan of network features than performed in the background by the monitoring engine 202. In one implementation, the scanning is performed in a centralized location as part of the network manager 200.

The reporting engine 206 can generate reports for use by a user (e.g., an administrator). The generated reports can provide information on identified problems. Additionally, the reports can recommend solutions to the identified problems. For example, recommended solutions can be determined according to the results of one or more diagnostic tests associated with the problem. The reports can also indicate which problems can be automatically corrected (e.g., network configuration settings) as well as other problems which require user action (e.g., to replace a bad or unplugged cable). In one implementation, an interface can be presented to the user for providing the reports. The interface can also provide for user input instructing the network manager 200 to automatically correct identified problems where possible.

The correction engine 208 can automatically correct identified problems. In one implementation, the correction engine 208 automatically corrects identified problems without user interaction. In another implementation, the correction engine 208 does not correct identified problems until instructed by the user.

In one implementation, the different engines of the network manager 200 can be distributed throughout the network. For example, different monitoring, scanning, and correction functions can be performed by various client devices (e.g., client devices 102) or servers (e.g., servers 104) in the network 100.

Figure 3:
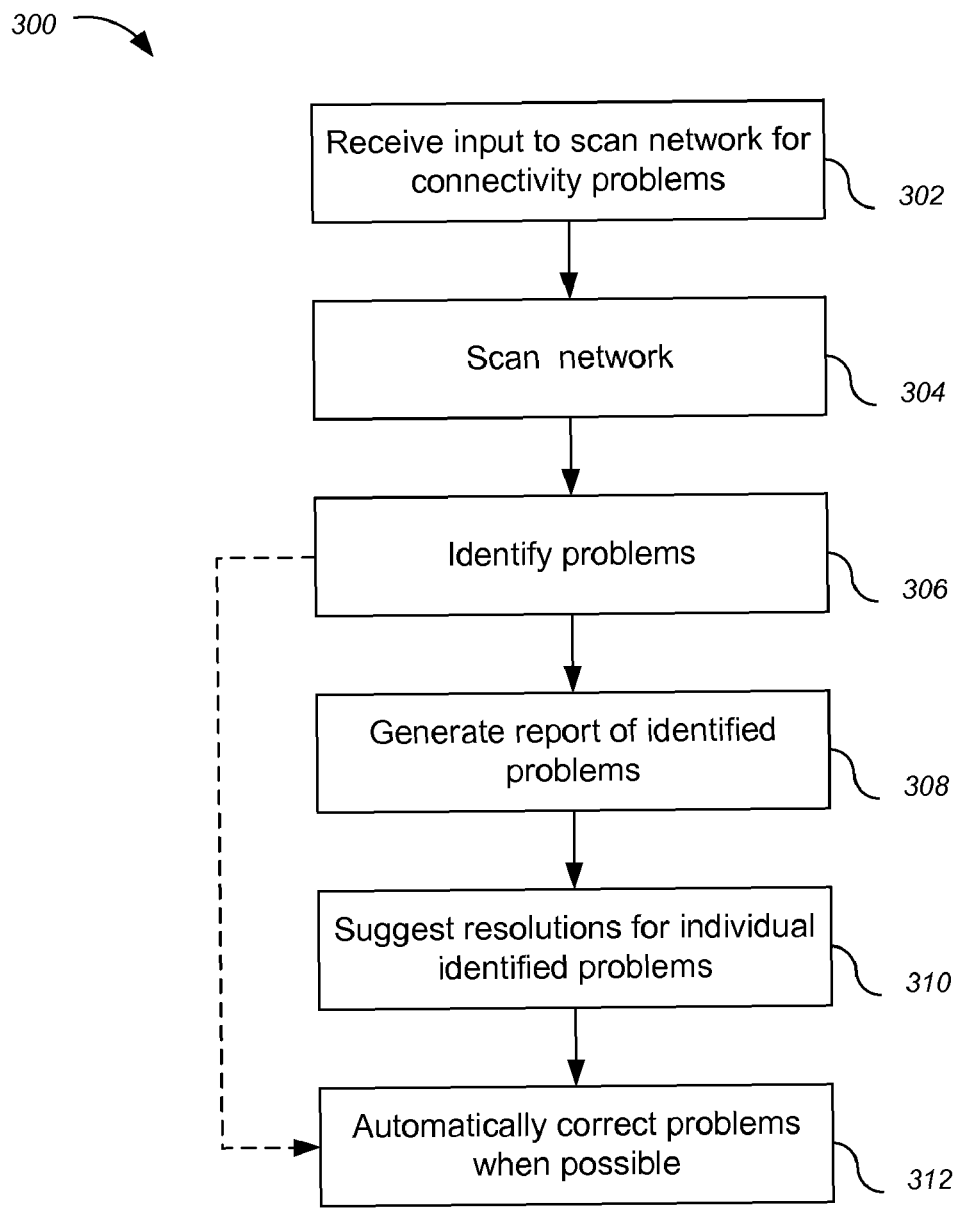
FIG. 3 shows an example process for correcting network problems.

FIG. 3 shows an example process 300 for correcting network problems. For convenience, the process will be described with reference to a system that performs the process (e.g., one or more components of the network manager 200).

The system receives an input (e.g., from a user) to scan the network (e.g., a SAN, LAN, WAN, or other network 100) for connectivity problems (e.g., problems with network configurations, network connections, and traffic flow) (step 302). For example, an administrative user can perceive a problem with the network and initiate the scan to identify the problem. In an alternative implementation, the input is from a scheduler according to a predefined schedule (e.g., daily, weekly).

The system scans the network (e.g., using scanning engine 204) (step 304). In one implementation, the scanning includes an invasive testing of the entire network fabric including, for example, clients, servers, fiber network, Ethernet network, storage devices, interconnections between devices, and configuration settings, as well as throughput and latency for the network traffic.

The scanning identifies one or more problems with the network (step 308). Problems can include configuration problems. For example, different client devices can be set to different time servers, which even if both are valid, are not synchronized. Other configuration problems can include a device that loses connectivity by activating a firewall that blocks particular ports necessary for the network. Additionally, users of individual client devices can inadvertently change configuration files for the network, causing a loss of connectivity.

Identified network problems can also be physical. For example, a connection can be lost due to an unplugged cable. Additionally, network cables that are bent or otherwise damaged can have a decreased throughput.

Scanning can include performing different diagnostic tests on the network. In one implementation, configuration data is compared for a number of client devices to identify problems caused by inconsistent data between client devices. For example, in one implementation, the time servers for each client device need to be consistent (e.g., to provide time synchronicity). However, different time servers on different client devices can appear valid when checked in individually. However, when the configuration data are compared, the problem is identified because the time servers on the client devices are not consistent.

In one implementation, the scanning is performed in addition to, or instead of, background monitoring (e.g., by monitoring engine 202). For example, the scanning can be performed to investigate potential problems based on a prompt (e.g., a user initiation or initiation by the monitoring engine 202). The scanning can also provide a greater depth of investigation than the background monitoring. For example, the active scan can perform tests or diagnostics that can not be performed in the background by the monitor engine.

In one implementation, for example, scanning can be used to test individual fibers connecting devices. An old or bent fiber channel cable can have suboptimal or intermittent performance that is not identified during passive monitoring. For example, the background monitoring can see the devices (e.g., a logical unit number of a storage device is identified, data passes to and from the device) but may not know the performance characteristics of particular paths or identify the particular reasons for lower performance (e.g., because of infrequent input/output, low utilization, a busy fiber switch, or an over-utilized array of devices). The scanning can stop traffic (e.g., input/output along the fiber) for fibers and then saturate each fiber (e.g., according to a particular order) in order to determine the performance characteristics of the fiber and whether the performance satisfies a particular threshold requirement.

A report is generated for the identified problems (e.g., using reporting engine 206) (step 308). The report can provide information on the identified problems, for example, the type of problem and the affected network devices or connections. In one implementation, the report categorizes the identified problems between those that require administrator action and those that can be corrected automatically. In one implementation, the report is provided in an interface that allows the user to select particular problems for automatic correction, or alternatively, allows the user to correct all automatically correctable problems with a single input (e.g., user click of a single button, or single keystroke).

The system automatically corrects problems when possible (e.g., using correction engine 208) (step 312). The system can automatically correct problems, for example, when identified by the user from the report. Alternatively, the system can automatically correct problems which are capable of being automatically corrected. One or more rules (e.g., in the correction engine) can define problems which can be corrected automatically. In one implementation, if a client machine has one or more bad configuration files, the system can automatically correct the configuration files to the appropriate configuration. Examples of configurations that can be automatically changed include firewall rules blocking network access (including SAN access), and configuration settings binding the client computer to an incorrect time server. Additionally, in another example, if a device is started after being offline, the controller (e.g., a network interface controller) can have incorrect configuration files. For example, the files defining volume configuration can be mismatched. The correct configuration files can be automatically copied to the controller.

Other configuration files can be unique to each controller. For example, a fsmlist file lists which volumes should be automatically started by a particular controller and on what corresponding IP address. In some implementations, each device has different IP addresses, so the system automatically determines (e.g., using monitoring engine 202 or scanning engine 204) whether all volumes are present, no old volumes are present, and that all IP address are correct. Additionally, if the devices are part of a private subnet, the system detects that all IP addresses are still on the private subnet. If the network has changed (e.g., while particular devices of the system were offline), the system can automatically correct the network configurations. For example, for a controller having an incorrect IP address, the system can determine which IP address can identify the other controllers of the network and automatically correct the IP address of the controller to match the identified IP address. Alternatively, the system can follow rules specified in the correct configuration files for the controllers identifying a preferred subnet and apply the configuration for the subnet to one or more controllers.

Identified problems which require administrator action cannot typically be automatically repaired. For example, if a device has gone offline, a user may need to physically check the network connections. In another example, if metadata latency is high as a result of processor overloading of one metadata server, the user can be required to provide input for balancing the load to one or more other metadata servers. Thus, in some cases the system can automatically correct the problem based on consent or other input from the user. Additionally, if a network cable is unplugged or damaged, the user will have to re-plug or replace the particular network cable.

In one implementation, after identifying problems in step 306, the system can automatically correct problems that can be automatically corrected as in step 312, while reporting problems that cannot be automatically corrected in step 308. Additionally, in one implementation, the report can include information on problems that have been automatically corrected.

Figure 4:
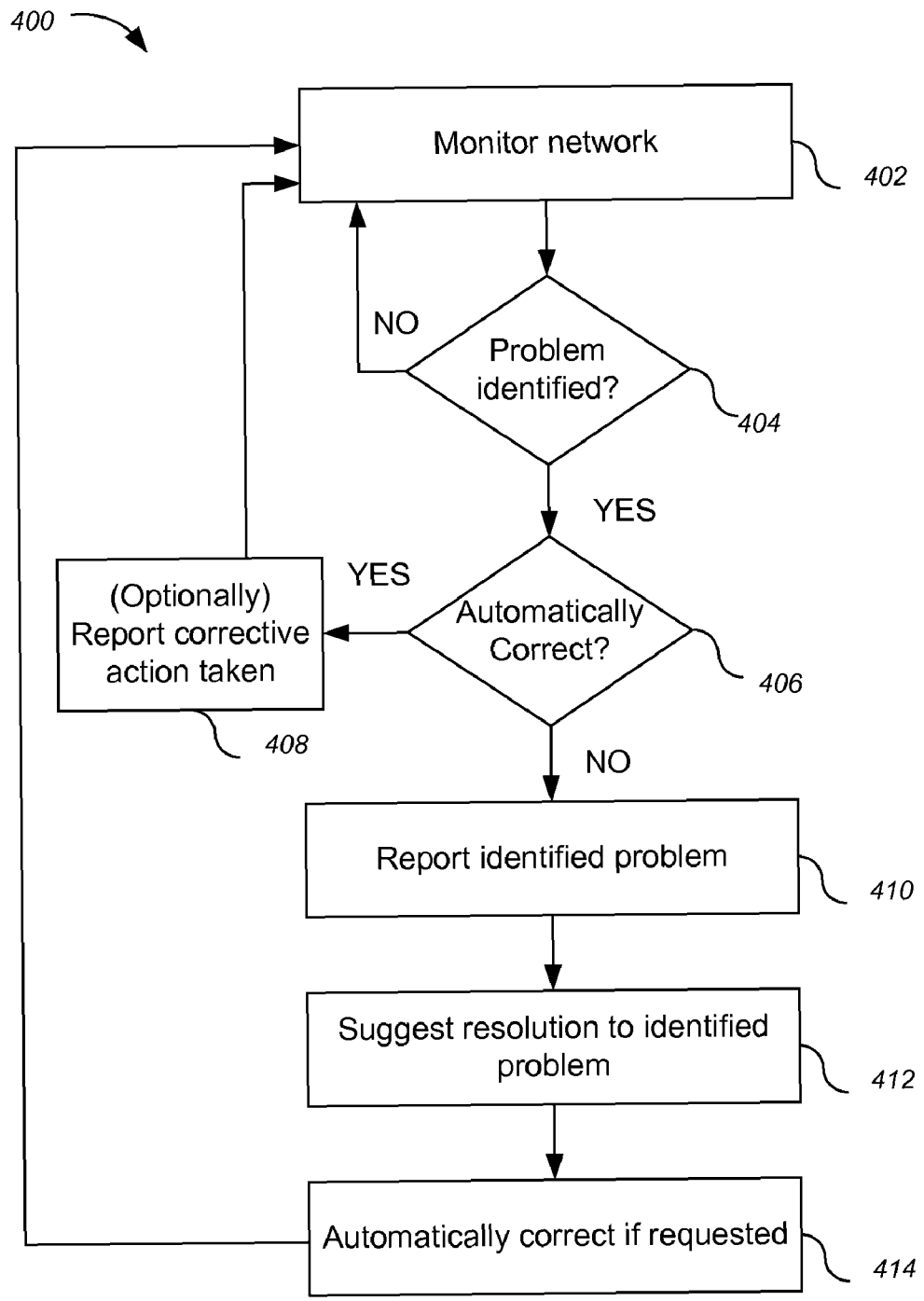
FIG. 4 shows another example process for correcting network problems.

FIG. 4 shows another example process 400 for correcting network problems. The system monitors the network (e.g., using monitoring engine 202) (step 402). The system monitors for problems in the network such as problems configuration settings, connections with the different devices connected to the network, as well as traffic flow and routing (e.g., latency problems). In one implementation, the system monitors for changes in the network which can cause problems. For example, the monitoring engine can monitor client devices for changes or attempted changes to configuration settings. In another implementation, the monitoring engine can monitor for changes in network performance that can indicate a problem. Diagnostic tests can be performed on monitored changes to determine if the change is a problem as well as one or more solutions to the problem. The monitoring can be performed in the background on a substantially constant basis. The monitoring can be performed without instruction from a user.

The monitoring continues until the system identifies a problem (step 404). The various problems identified by the system can include the problems described above with respect to FIG. 3 as identified by scanning. When a problem is identified, the system can determine whether or not to automatically correct the identified problem or to report the identified problem (step 406). For example, the system can include rules for types of problems for which the system is allowed to perform automatic corrections without reporting. In one implementation, there are no corrections which can be performed without first reporting and receiving user input. Additionally, some problems, as discussed above, may not be capable of being automatically corrected by the system.

If the identified problem is automatically corrected, the system can optionally generate a report for the user identifying the corrective action taken (step 408). The monitoring can continue (step 402).

If the identified problem is not automatically corrected, the system generates a report including the identified problem (step 410). The system can suggest a resolution to the identified problem (step 412). The suggestion can be included as part of the report or separately generated. For example, the user can view the report and then request additional information, which can include suggested responses. The suggestion can be based on the results of one or more diagnostics tests performed on the network and associated with the identified problem.

The system can automatically correct the reported problem if requested by the user (step 414). In one implementation, the user can only request automatic correction for problems that are capable of automatic correction by the system (e.g., configuration file settings and not unplugged network cables). Additionally, in another implementation, the user can first provide additional information prior to the system performing the correction. For example, the user can provide information on how to balance the load of an overloaded metadata server among one or more other metadata servers. Network monitoring can resume (step 402).

In one implementation, the system can prevent users (e.g., users of individual client devices) from making detrimental changes that will affect their connectivity or network performance. For example, the network manager can monitor client device activity and alert the client user if their actions caused or are likely to cause a network problem. For example, after a user of a client device made a change, the network manager can generate an alert presented to the user. The presented alert can indicate that their action will cause a problem with their network access. Additionally, the alert can indicate that their attempted change was prevented/corrected. In one implementation, the alert suggests that the user of the client device consult their administrator prior to attempting the change again. For example, if the user of a client device attempts to turn off one of the client device's Ethernet ports, they will receive a dialog box alert indicating that network connectivity will be lost if the user proceeds with the change.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer program products, i.e., one or more modules of computer program instructions encoded on a computer-readable medium for execution by, or to control the operation of, data processing apparatus. The instructions can be organized into modules in different numbers and combinations from the exemplary modules described. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method, comprising:
   scanning a network for one or more network connectivity problems, where scanning includes performing an active scan of the network;
   identifying one or more network connectivity problems, the identifying including comparing network configuration data for each of a plurality of electronic devices coupled to the network for inconsistencies between devices; and
   correcting the one or more identified problems.

2. The method of claim 1, further comprising:
   generating a report of the one or more identified problems; and
   recommending corrective action for each of the one or more identified problems.

3. The method of claim 2, further comprising:
   receiving user input selecting one or more problems to correct; and
   correcting the selected problems.

4. The method of claim 1, further comprising:
   receiving an input to scan the network for problems.

5. The method of claim 1, where correcting the one or more identified problems includes automatically correcting the identified problems.

6. The method of claim 1, where scanning the network includes performing the scanning according to a schedule.

7. The method of claim 1, where identifying the one or more problems includes performing one or more diagnostic tests.

8. The method of claim 1, where identifying the one or more problems includes comparing configuration settings for more than one device associated with the network.

9. The method of claim 1, where identifying the one or more problems includes identifying a problem with one or more configuration files.

10. The method of claim 1, where identifying the one or more problems includes identifying a network latency problem.

11. A method, comprising:
    monitoring for one or more connectivity problems associated with a network where monitoring includes monitoring for changes to network configuration settings for each of one or more devices coupled to the network;
    identifying a network connectivity problem; and
    recommending corrective action for the identified problem.

12. The method of claim 11, the monitoring including monitoring the network using a plurality of electronic devices distributed throughout the network.

13. The method of claim 11, further comprising:
determining whether to report the identified problem or to automatically correct the identified problem according to one or more correcting rules.

14. The method of claim 13, further comprising:
generating a report of the identified problem.

15. The method of claim 14, further comprising:
receiving a user input to correct the identified problem; and correcting the identified problem.

16. The method of claim 14, further comprising:
automatically correcting the identified problem.

17. The method of claim 16, further comprising:
generating a report identifying the corrected problem.

18. The method of claim 11, where monitoring includes monitoring for changes in network performance.

19. A system, comprising:
a monitoring engine for monitoring a network, the monitoring engine including a plurality of monitoring components distributed throughout the network and operable to perform one or more monitoring operations to identify one or more types of network connectivity problems; and
a correction engine operable to automatically correct identified network problems.

20. The system of claim 19, further comprising:
a reporting engine operable to present identified problems to a user and to recommend action to correct the identified problems.

21. The system of claim 19, where the network is a storage area network using a network fabric formed from one or more fiber channel switches.

22. The system of claim 21, where the storage area network includes a plurality of storage devices and a plurality of clients.

23. The system of claim 19 where the monitoring engine is operable to monitor performance of a storage area network to identify one or more network connectivity problems.

24. The method of claim 1, further comprising:
verifying network connectivity following correction.

25. The method of claim 1, where the scanning the network includes scanning network traffic flow within the network.

* * * * *